United States Patent [19]

Scherman

[11] Patent Number: 4,460,098

[45] Date of Patent: Jul. 17, 1984

[54] PENDANT CONTROL SYSTEM FOR PENDANT SUPPORTED BOOM

[75] Inventor: Terrance C. Scherman, Cedar Rapids, Iowa

[73] Assignee: FMC Corporation, Chicago, Ill.

[21] Appl. No.: 393,984

[22] Filed: Jun. 30, 1982

[51] Int. Cl.$^3$ .............................................. B66C 23/04

[52] U.S. Cl. .................................... 212/187; 212/231; 212/264; 212/268

[58] Field of Search ......................... 212/149, 153-155, 212/159, 182, 162-164, 187, 223, 230, 231, 239, 255, 256, 262, 266, 267, 245; 52/116-118

[56] References Cited

U.S. PATENT DOCUMENTS

| | | | |
|---|---|---|---|
| 2,868,392 | 1/1959 | Poffenberger | 212/8 |
| 2,999,600 | 9/1961 | Gates | 212/55 |
| 3,308,967 | 3/1967 | Barkley et al. | 212/55 |
| 3,371,799 | 3/1968 | Brownell et al. | 212/35 |
| 3,458,053 | 7/1969 | Reuter | 212/182 |
| 3,465,899 | 9/1969 | Reuter et al. | 212/267 |
| 3,727,359 | 4/1978 | Vonck | 52/121 |
| 3,856,151 | 12/1974 | Lamer | 212/55 |
| 4,053,058 | 10/1977 | Jensen et al. | 212/8 |
| 4,133,411 | 1/1979 | Curb | 182/2 |
| 4,156,331 | 5/1979 | Lester et al. | 52/115 |
| 4,336,889 | 6/1982 | McGrew | 212/245 |
| 4,352,434 | 10/1982 | Poock | 212/230 |

*Primary Examiner*—Trygve M. Blix
*Assistant Examiner*—Stephen P. Avila
*Attorney, Agent, or Firm*—A. J. Moore; H. M. Stanley; R. B. Megley

[57] ABSTRACT

A pendant control system for pendant supported multisection telescopic boom is disclosed for paying out or hauling in sufficient pendant rope in response to detecting changes in the boom-mast angle from a desired angle Y thereby preventing the free end of the boom from raising due to extension and dropping due to retraction of the boom when the outer end of the boom is supported by pendant ropes. The system also provides means for pivoting the mast between a raised boom supporting position and a lowered transport position while maintaining tension on the pendant lines.

5 Claims, 4 Drawing Figures

PENDANT CONTROL SYSTEM FOR PENDANT SUPPORTED BOOM

CROSS REFERENCE TO RELATES APPLICATIONS

The present invention is similar to the inventions disclosed in the following copending applications assigned to the assignee of the present invention:

Poock Application Ser. No. 145,529 which was filed on May 1, 1980 which issued on Oct. 5, 1982 as U.S. Pat. No. 4,352,434 entitled Pendant Supported Hydraulic Extensible Boom.

Cozad Application Ser. No. 293,727 which was filed on Aug. 17, 1981 and is entitled Low Droop Multi-Part Pendant Supported Boom.

Poock et al Application Ser. No. 393,986 which was filed on June 30, 1982 entitled Floating Sheave Type Pendant Pay-Out System For Pendant Supported Boom, and filed on even date herewith.

Poock Application Ser. No. 393,985 which was filed on June 30, 1982 entitled External Pendant Pay-Out System With Anti-Droop Control, and filed on even date herewith.

White Application Ser. No. 393,983 which was filed on June 30, 1982 entitled Pendant Supported Boom With Fixed And Live Pendant Portions, and filed on even date herewith.

BACKGROUND OF THE INVENTION

1. Field of the Invention

The present invention relates to multi-section pendant supported telescopic booms and more particularly relates to a pendant pay-out or control system for preventing the boom from pivoting upwardly due to extension of the boom and downwardly due to retraction of the boom.

2. Description of the Prior Art

Multi-section, pendant supported telescopic booms for cranes or the like are well known in the art. It is also well known that such booms may be supported by pendant ropes that are located entirely externally of the boom, or may be of the type that have external pendant portions as well as internal pendant portions that are reeved around sheaves within the boom. Booms of the type having only external pendant ropes that are attached to, or near, the tip end of the boom and are trained over the upper end of a mast pivoted to the boom tend to raise the boom tip and decrease the angle between the mast and the boom in response to extension of the boom; and tend to lower the boom tip and to increase said angle in response to retraction of the multi-section boom.

The types of booms which are supported by pendants having both internal and external pendant portions such as disclosed in the aforementioned Cozad application, operate in a reverse manner, i.e., the tip drops when extended and raises when retracted.

It is also well known in the art to extend and retract several sections of a multi-section boom with one or two hydraulic rams. U.S. Pat. No. 4,156,331 which issued to Lester et al on May 29, 1979 illustrates such a boom which uses two rams; and U.S. Pat. No. 4,133,411 which issued to Curb on Jan. 9, 1979 illustrates a boom operated by a single ram.

SUMMARY OF THE INVENTION

In accordance with the present invention a pendant pay-out or control system is disclosed which will maintain the angle between the boom and mast substantially constant during extension and retraction of the multi-section boom during normal operating conditions, and which will fold the mast against the boom and maintain the pendant lines tight when the boom has been lowered to its transport position.

DESCRIPTION OF THE PREFERRED EMBODIMENT

Figures 1, 2, 3:
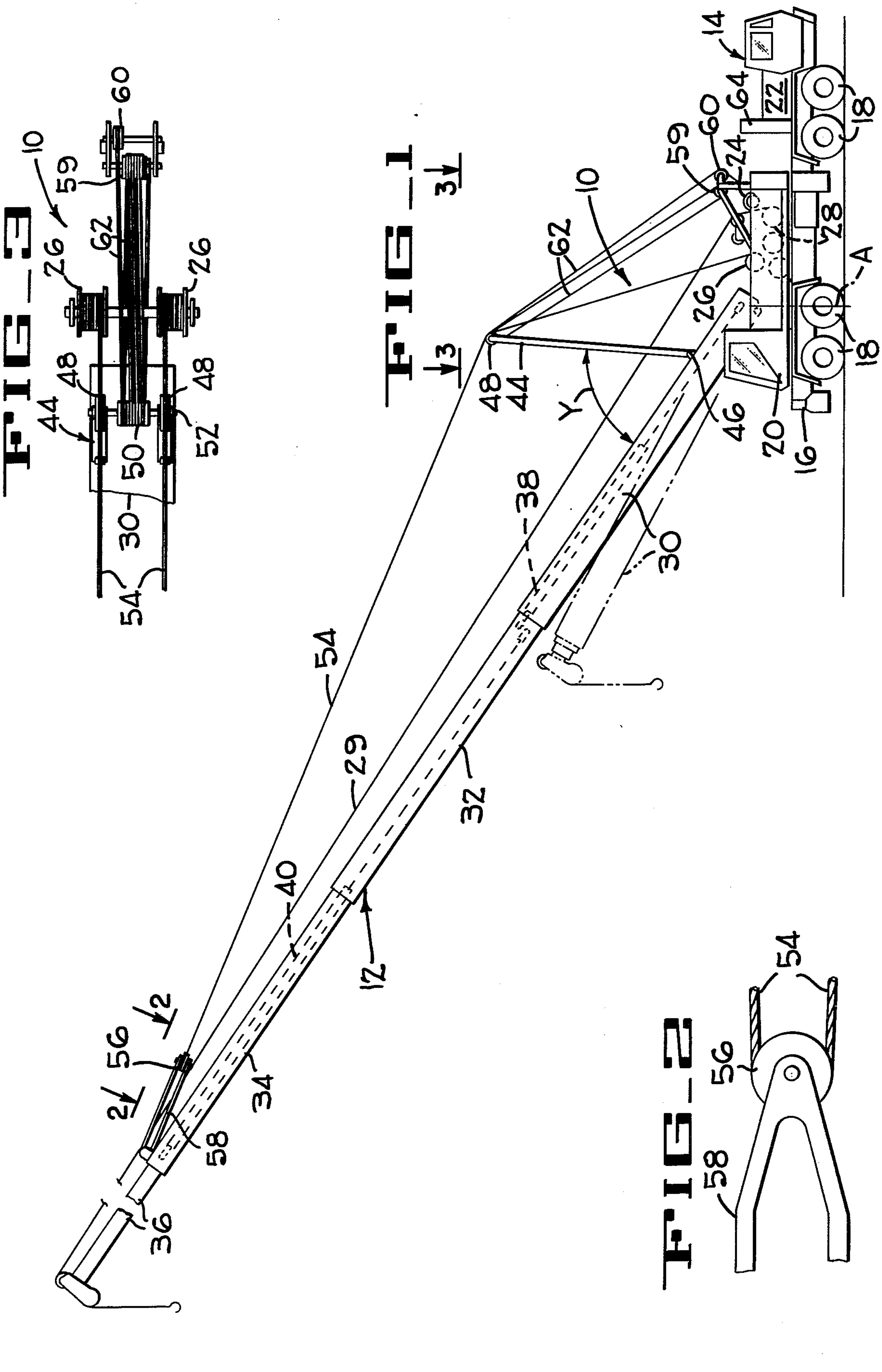
FIG. 1 is a diagrammatic side elevation of a crane having a boom supported by external pendant lines illustrated in an extended operative position in solid lines; and illustrating in dotted lines the direction of boom droop due to retraction when the control system is inoperative. It will be understood that when fully retracted the tip of the boom would pivot downwardly until stopped by contact with the ground.
FIG. 2 is an enlarged view looking in the direction of arrows 2—2 of FIG. 1 illustrating the manner of connecting the pendant line to the outer end of one of the boom sections.
FIG. 3 is an enlarged plan looking in the direction of arrows 3—3 of FIG. 1 illustrating the pendant pay-out drums and further illustrating the boom hoist drum and its connection to the mast.

The pendant pay-out or control system 10 (FIGS. 1 and 4) of the present invention is illustrated in conjunction with a multi-section extensible boom 12 of a mobile crane 14. The crane 14 includes a chassis 16 supported on wheels 18 with an upper works 20 mounted for rotation on the chassis 16 about a vertical axis A. The crane includes an engine 22 which provides power for driving at least some of the wheels 18, for rotating the upper works 20, and for driving hydraulic pump and motors (to be described hereinafter) which provide power for several winches including a boom supporting winch 24, a pendant take-up winch 26, and a load line winch 28. The load line winch is provided to raise and lower a load on the load line 29 trained over the outer end of the boom.

The boom 12 is illustrated as a four section boom that is supported by external pendants, which boom includes a base section 30 pivoted to the upper works 20 about a horizontal axis, an intermediate section 32, a tip section 34 and a manual section 36. The four boom sections are telescopically received within each other in a manner conventional in the art. Also, the boom sections may be extended and retracted in a manner conventional in the art. For example, a first hydraulic cylinder 38 connected between the base section 30 and the intermediate section 32 and a second hydraulic cylinder 40 connected between the intermediate section 32 and the tip section 34 may be used for extending and retracting the boom sections under the control of an operator.

A mast 44 is pivoted at 46 to the base section 30 near the inner end of said base section. A pair of sheaves 48 and a multi-grooved sheave 50 are journaled on a shaft 52 secured to the upper end of the live mast. A boom supported pendant line 54 has its end portions wound around the pendant take-up winch 26. As best shown in FIG. 2, the mid portion of the pendant line 54 is trained around a sheave 56 journaled on a bridle 58 pivotally connected to the outer or tip end of the tip section 34. Although a pendant take-up winch with two take-up drums is illustrated in FIG. 3, it is apparent that a single drum may be used with one end of the pendant line 54 trained around the drum and the other end dead ended.

The boom 12 is raised and lowered by the boom supporting winch 24 which is connected to the multi-grooved sheave 50 (FIGS. 1 and 3), a second multi-grooved sheave 59, and a sheave 60 by a rope 62 trained over said sheaves as clearly shown in FIG. 3.

Figure 4:
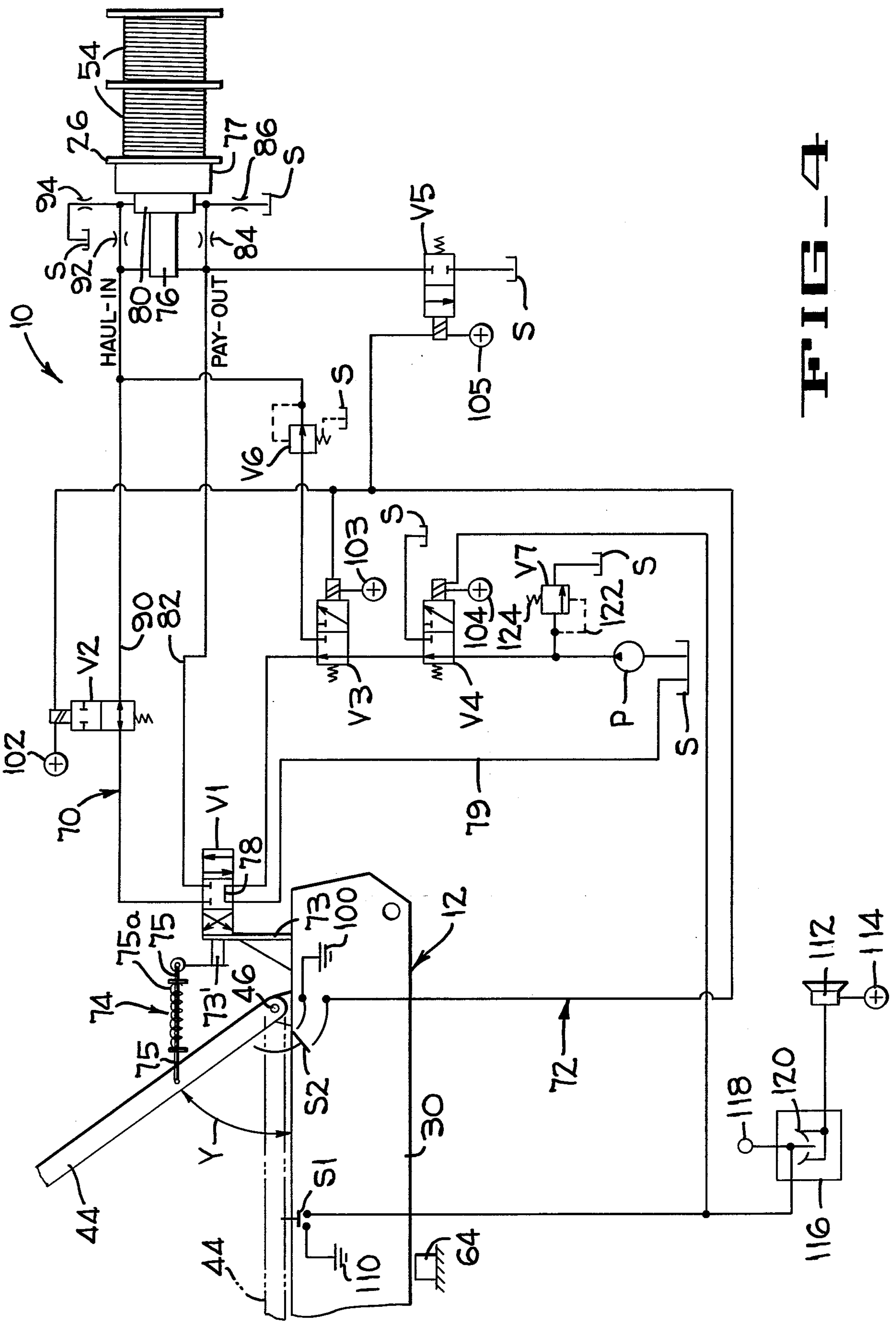
FIG. 4 is a combined hydraulic and electrical diagram illustrating the controls for the pendant pay-out system.

Conventional controls (not fully shown) are provided to enable the operator to selectively operate the cylinders 38,40 to extend and retract the boom sections, and to operate the boom supporting winch 24 to raise and lower the boom 12. It will be understood that the boom supporting winch 24 is strong enough to overpower the pendant take-up winch 26 so that the boom supporting winch 24 can pull pendant line 54 off the pendant take-up winch 26 thereby causing the winch 26 to act as a pump rather than a motor when the mast 44 is being raised to its working position. It will also be understood, that the boom may be pivoted between its raised and extended working position shown in solid lines in FIG. 1, and a retracted position shown in dotted lines in FIG. 1. Also, it will be apparent that the boom 12 and the upper works 20 may be pivoted 360° about axis A (FIG. 1), and that the boom may be lowered into transport position against the boom rest 64 as illustrated in FIG. 4.

As previously mentioned, when the boom supporting winch 24 is held stationary, and when no pendant pay-out control system is provided; extension of the boom (which is supported only by external pendant lines) will cause the boom-mast angle Y (FIGS. 1 and 4) to decrease causing the tip of the boom to raise during extension. Accordingly, when the boom is retracted the tip of the boom will drop and the angle Y will increase.

The pendant pay-out system 10 of the present invention is designed to automatically maintain the angle Y substantially constant during extension and retraction of the boom when the boom hoist is held stationary. This simplifies the operator's task of handling a load supported by the load line 29 since he need not make load positioning corrections due to extension and retraction of the boom.

The control system 10 includes a hydraulic circuit 70 and a direct current electrical circuit 72. It will be understood that a conventional main switch (not shown) is included in the electrical circuit and is open when the crane is not operating and must be closed when the crane is placed in operation.

The hydraulic circuit includes a four-way mechanically operated valve V1 that is supported on the base section 30 of the boom 12 by a bracket 73 and has its body 73' pivotally connected to the mast 44 by a spring-loaded over-link 74 defined by a pair of rods 75 normally held in abutting contact by a spring 75*a*. The circuit also includes solenoid operated, spring return valves V2, V3, V4 and V5; spring loaded relief valves V6 and V7; and a hydraulic motor 76 which drives the pendant take-up winch 26 through a gear reducer 77 after a spring set-hydraulically released brake 80 has been released. The hydraulic system also includes a pump P which is powered by the engine 22 (FIG. 1) of the crane 14 and draws its hydraulic fluid from a sump S.

After the mast 44 and boom 12 have been lifted off the boom rest 64 into a desired operating position by the winches 24 and 26, the desired mast-boom angle Y is established. At this time, the four-way valve V1 is centered and the above described valves are in the positions illustrated in FIG. 4. High pressure fluid is drawn from the sump S by the pump P and is directed through a parallel passage in valve V4, through a parallel passage in valve V3, through a passage 78 in the central section of valve V1, and is returned to sump S by conduit 79.

As the operator extends the boom, the angle Y decreases moving the body of the valve V1 to its parallel passage position. High pressure fluid then flows through valve V1, through a conduit 82 to the pendant pay-out side of the hydraulic motor 76. Flow control valves 84,86 which restrict free flow of hydraulic fluid to the brake 80 and sump S build up sufficient pressure to release the brake 80 driving pendant take-up drum 26 in the pay-out direction. Low pressure fluid discharged from the motor 76 flows through conduit 90, parallel passage in valve V2, a parallel passage in valve V1, through conduit 79 to the sump S. As the pendant rope 54 is paid out, the angle Y of the mast 44 until return to its normal position thereby returning valve V1 to its illustrated centered position. Fluid from the pump P will then return to sump S through conduit 79, and fluid in line 82 will bleed past flow control valves 84,86 into sump S thus causing springs (not shown) in the brake 80 to lock the brake and pendant take-up winch 26 in fixed position.

When the operator retracts the boom 12, the angle Y increases thereby shifting valve V1 to its cross-passage position. High pressure fluid from pump P then flows through valve V1, through the conduit 90, through parallel passage in valve V2, and into the rope haul-in side of hydraulic motor 76. Flow control valves 92,94 build up sufficient hydraulic pressure to release the brake 80 and resist free flow past valve 94 to sump S. Most of the low pressure fluid discharged from the pay-out side of the motor 76 flows through conduit 82, a cross passage in valve V1, and conduit 79 to sump S. As the rope is hauled in, the angle Y of the mast 44 will return to its normal position thereby returning valve V1 to its illustrated centered control position. Fluid pressure in line 90 is released and the fluid is drained to sump S past flow control valves 92,94. The main flow of fluid from the pump P returns to sump S through passage 78 in valve V1 and conduit 79.

When it is desired to position the boom 12 and mast 44 in the transport position, the boom is first fully retracted by conventional controls, and the boom is lowered onto the boom rest 64 by means of the boom supporting winch 24 which is operated by conventional controls.

When the boom 12 is resting on the boom rest 64 and the mast is being lowered out of a predetermined minimum angular control range, valve V1 is shifted into its parallel passage position and the link portions 75 separate. Lowering of the mast closes switch S2 which closes a portion of the electrical circuit 72 between ground at 100 and positive terminals at 102 103 and 105 of the direct current source of electrical power thereby energizing the solenoids of valves V2,V3 and V5. Energization of valve V2 shifts valve V2 to a position blocking flow therethrough to prevent flow of high pressure fluid through conduit 90 to the haul-in side of motor 76 as previously described. However, energization of valves V3 and V5 shifts valve V3 to its cross-passage position, and shifts valve V5 to its parallel passage position. Thus, high pressure hydraulic fluid from pump P flows through parallel passage in valve V4, cross-passage in valve V3, parallel passage in reducing valve V6, into the haul-in side of motor 76 and past flow control valve 92 to release the brake 80 and haul in the pendant rope 54 to take up slack and maintain a predetermined pull on the pendant rope 54 to keep it taut. At this time, low pressure fluid is discharged to sump S through the parallel passage in valve V5.

When the mast 44 is fully lowered into its transport position, switch S1 is closed between ground at 110 and positive terminals at 104 thereby shifting valve V4 to its cross passage position. Also, closing switch S1 prepares a circuit to an audible warning device, such as a warning buzzer 112, and terminal 114. The buzzer circuit will be closed if the operator actuates boom telescoping control 116 (only the electrical features of the control being illustrated) upon shifting the lever 118 either to the boom extend or boom retract position which closes a double pole switch 120. In place of or in addition to the warning buzzer 112, an override or kick-out may be provided in the circuit which would in effect deactivate the extend and retract lever 118. Thus the operator cannot unknowingly operate the telescopic control when the mast 44 is in its stowed position.

With switch S1 closed and valve V4 shifted to its cross-passage position, high pressure hydraulic fluid from the pump P flows through the cross-passage in dump valve V4 directly to sump.

In order to move the boom from the stowed position illustrated in FIG. 4 to its raised working position (FIG. 1) the conventional main electrical switch (not shown) is first closed and then the operator merely "booms up" i.e., operates the boom supporting winch 24 by a conventional control (not shown). Operating the winch in a lifting direction causes the rope 62 (FIG. 3) to first raise the mast 44 and thereafter raise the boom 12.

Raising of the mast opens switch S1 (FIG. 4) deactivating the portion of the circuit to the warning buzzer 112 and de-energizing valve V4. Valves V2, V3 and V5 remain energized while the mast is being raised since switch S2 is closed. During this time high pressure fluid flows from pump P, through parallel passage in de-energized valve V4, through cross-passage and energize valve V3, through the passage in pressure reducing valve V6 into the haul-in side of motor 76 and into brake 80 with the low pressure fluid being discharged to sump S through parallel passage in energized valve V5.

Thus, hydraulic motor 76 tends to haul in pendant rope 54 while the mast is being raised, and the more powerful boom supporting winch 24 tends to cause the pendant rope to be paid out. At this time the boom winch 24 overpowers the smaller hydraulic motor 76 of the pendant take-up winch 26 thus pulling pendant rope 54 off the winch 26 causing the motor 76 to act as a hydraulic pump, rather than a motor, causing the fluid to flow from the sump S through valve V5, through pendant hoist motor 76, valve V6, cross-passage in energized valve V3, and parallel passage of de-energized valve V4. The resulting high pressure between valve V4 and pump P enters a pilot line 122 to valve V7 and is at higher pressure than the resisting force exerted by a spring 124 thereby opening valve V7 returning hydraulic fluid to sump S.

When the mast 44 reaches its operative position, manual valve V1 is returned to its illustrated centered position and switch S2 is opened thereby returning the solenoid valves V2,V3 and V5 to the positions illustrated in FIG. 4. The hydraulic circuit 70 will then automatically maintain the boom-mast angle Y substantially constant during extension and retraction of the boom as previously described.

It will be understood that the size of the valve V1 and connecting link 74 as illustrated in FIG. 4 are at a much larger scale than the boom and mast. Thus, very small changes in the angle Y will shift the valve V1 to its cross-passage or parallel passage position.

The multi-section telescopic boom as disclosed herein is supported by external pendants only, in which case extension of the boom tends to decrease the mast-boom angle Y thus raising the outer end of the boom; while retraction of the boom increases the angle and causes the outer end of the boom to lower. As mentioned previously, a boom supported by both external and internal pendant portions, such as that disclosed in the cross referenced Cozad application, operates in exactly the reverse manner. That is, extension causes the angle Y to increase and lower the outer end of the boom, while retraction of the boom causes the angle to decrease and the outer end of the boom to be raised.

It will be understood, therefore, that the system 10 illustrated in FIG. 4 may be used with booms supported by both external and internal pendant ropes but that the location of the cross-passages and parallel passages must be reversed, i.e., the parallel passages should be on the left (FIG. 4) and the cross-passages should be on the right of the central portion of the valve V1.

From the foregoing description it is apparent that a pendant pay-out system is provided for automatically detecting slight changes in the desired operative angle between the boom and the mast due to extension or retraction of the boom, and that the disclosed system will return this angle to the desired angle by means of a control system that is responsive to changes in the operative angle for actuating the hydraulic motor of the pendant take-up winch which either hauls in or pays out pendant rope until the desired operative angle is again established.

Although the best mode contemplated for carrying out the present invention has been herein shown and described, it will be apparent that modification and variation may be made without departing from what is regarded to be the subject matter of the invention.

What is claimed is:

1. A pendant control system for a pivotally supported multi-section telescopic boom with means for selectively extending and retracting the sections, said boom having a mast pivoted thereon and movable to a desired mast-boom working angle by power driven boom supporting means connected to the mast and capable of selectively raising and lowering the mast and boom; said pendant control system comprising pendant means trained over said mast and connected to an outer end portion of the boom and to a pendant winch, second power means for driving said winch in a pendant pay-out or haul-in direction, means responsive to changes in said desired working angle within a predetermined minimum angular control range for activating said second power means for driving said winch in a direction which will return said mast to said desired working angle, and switch means responsive to movement of said mast out of said minimum angular control range and toward a stowed position for deactivating said means responsive to changes in said working angle and for driving said second power means and said winch in a pendant haul-in direction to haul in said pendant means and maintain tension thereon.

2. A system according to claim 1 and additionally comprising second switch means, and wherein movement of said mast into stowed position actuates said second switch means for deactivating said second power means.

3. A system according to claim 2 and additionally comprising a warning circuit including an audible warning device and boom telescoping control means for controlling said means for extending and retracting said boom sections, and wherein positioning said mast in said stowed position prepares said warning circuit, and wherein actuation of said boom telescoping control means in either the extend or retract position actuates said warning device.

4. A system according to claim 1 wherein said second power means is a hydraulic motor in a hydraulic circuit, wherein said switch means is in an electric circuit, and additionally comprising a solonoid operated dump valve in said electric circuit and said hydraulic circuit, closing of said switch means being effective to close said electric circuit to said dump valve for energizing said solenoid and returning hydraulic fluid to a sump.

5. A system according to claim 4 wherein said mast is pivoted upwardly from said stowed position to said desired mast-boom working angle by said power driven boom supporting means when actuated in a mast lifting direction, said power driven boom supporting means overpowering said hydraulic motor of said second power means thereby causing said hydraulic motor to act as a pump for maintaining tension on said pendant while said mast is raised to said working angle.

* * * * *